United States Patent Office 2,964,548
Patented Dec. 13, 1960

2,964,548

PROCESS FOR THE PREPARATION OF CYCLO-MATIC MANGANESE COMPOUNDS

Jerome E. Brown, Detroit, Mich., and Earl G. De Witt and Hymin Shapiro, Baton Rouge, La., assignors to Ethyl Corporation, New York, N.Y., a corporation of Delaware No Drawing. Filed Aug. 5, 1959, Ser. No. 831,695

6 Claims. (Cl. 260—429)

This invention relates to a process for the synthesis of novel hydrocarbon manganese compounds and in particular, to a process for the synthesis of cyclomatic or cyclopentadienyl-type manganese compounds.

A novel type of manganese compound, in which the manganese is bonded to an organic or hydrocarbon radical by a carbon-to-manganese bond through a carbon which is part of a five-membered cyclopentadienyl-type ring, has been recently discovered. These compounds are useful as additives to lubricating oils and hydrocarbon fuels for the purpose of improving their lubricating and combustion properties, respectively. The compounds have also been found to be useful in the synthesis of still other manganese compounds which have the property of enhancing antiknock quality of hydrocarbon fuels. The discovery of these valuable manganese compounds has sparked a search for an economical method of synthesizing them.

It is therefore, an object of our invention to provide a process for the preparation of cyclopentadienyl-type manganese compounds. It is also an object of this invention to provide a process for the synthesis of cyclopentadienyl-type manganese compounds which employs simple chemical reagents or compounds. Another object of this invention is to provide a method for the synthesis of cyclopentadienyl-type manganese compounds which utilizes a minimum number of steps in the process. Additional important objects of this invention will become apparent from the discussion which follows.

The above and other objects of this invention are accomplished by providing a process for the preparation of hydrocarbon cyclomatic manganese compounds having the general formula RMnR' wherein R and R' are cyclomatic hydrocarbon radicals having from 5 to about 17 or more carbon atoms which embody a group of 5 carbons having the general configuration found in cyclopentadiene, said compound being further characterized in that the cyclomatic hydrocarbon radicals are bonded to the manganese through the carbons comprising the cyclopentadienyl-group configuration, said process comprising reacting manganese metal with a cyclomatic hydrocarbon having from 5 to about 17 or more carbon atoms which embody a group of 5 carbons having the general configuration found in cyclopentadiene. The cyclopentadienyl-type manganese compounds are smoothly produced in good yield and are readily purified. For certain purposes, however, the reaction mixture containing the product can be utilized without separation, as when used in the preparation of other manganese compounds.

For best results in terms of over-all operation and reaction efficiency, we prefer to use manganese which is in what we call a "reactive" state. By a "reactive manganese metal" is meant a manganese metal which has an uncontaminated surface and which readily enters into reaction with cyclopentadiene and other cyclomatic hydrocarbon compounds having the general formula

RH wherein R is as described above. For instance, the manganese metal should be free from a coating of oxides which would prevent contact between the cyclopentadienyl compound and the reactive metal and thus hinder reaction. This surface active or reactive manganese metal can be obtained by a number of different methods, each having its merits, which will be discussed more fully below.

The reactive manganese metal can be in the form of particles of varying size, turnings, or pure manganese metal cast into bars or rods. For example, the manganese metal can be reacted in the form of finely-divided particles of from about 2 to 500 microns in diameter with a cyclomatic hydrocarbon, such as cyclopentadiene, to give a cyclomatic manganese compound, such as dicyclopentadienyl manganese.

One method of carrying out the process of this invention in the synthesis of hydrocarbon cyclomatic manganese compounds comprises reacting a cyclopentadienyl-type compound, RH, with freshly reduced manganese in a liquid medium at temperatures of 0 to 500° C. Best results are obtained when the reaction mixture is maintained between 250 and 400° C. The liquid medium can be an ether, a hydrocarbon, or a mixture of the two as defined more fully hereinbelow. The cyclopentadienyl-type compound can be added to the reaction vessel either in the liquid or vapor state, and the addition can be effected either above or below the surface of the liquid medium containing the reactive manganese.

Another mode of carrying out our invention comprises reacting manganese metal and a vaporized or gaseous cyclopentadienyl-type compound, RH, in the absence of any diluent or solvent, in other words, in a reaction medium consisting essentially of said manganese and said vaporized hydrocarbon. This is accomplished by passing the cyclopentadienyl-type compound over manganese metal, preferably "reactive," in a reaction zone maintained at a temperature of 0 to 600° C. It is found that the cyclopentadiene reactant can be maintained in the vapor state at temperatures as low as 40° C., and no great advantage is gained in going above about 400° C. Therefore, a preferred temperature range for reaction between reactive manganese metal and cyclopentadienyl-type compounds in the vapor state is from about 250° to about 400° C.

Our process can be carried out in the presence of a catalyst. Examples of catalysts that can be used are the metals of groups VB and VIB of the periodic table having atomic numbers from 22 to 74, their oxides, and their ammonium and oxygen derivatives. Thus, the catalysts can be composed of the elements V, Cb, Ta, Cr, Mo, and W. Typical oxide catalysts include $CrO$, $Cr_2O_3$, $CrO_2$, $CrO_3$, $WO_2$, $WO_3$, $VO$, $V_2O_3$, $VO_2$, $V_2O_5$, $CbO$, $CbO_2$, $Cb_2O_3$, $Cb_2O_5$, $Mo_2O_3$, $MoO_2$, $MoO_3$, $Mo_2O_5$, $TaO_2$, etc. Examples of ammonium and oxygen derivatives of catalysts that can be used are ammonium chromate, ammonium molybdate, ammonium tungstate, ammonium vanadate, etc. The amount of catalyst employed when the reaction is carried out either with or without the presence of a liquid diluent or solvent ranges from 0.01 to 10 weight percent based on the amount of reactive manganese used. Best results, however, are obtained when the amount of catalyst is from 0.1 to 3 weight percent based on the manganese used and this constitutes a preferred embodiment of our invention.

Our process possesses many advantages over the prior art. The process operates smoothly and rapidly and is subject to close operational control. Further, it represents a great simplification over prior art processes since it provides a means for going directly from manganese and a cyclopentadiene hydrocarbon to the final product in one step. All prior are processes require at least two steps. Our process, therefore, provides the opportunity for great economies in time, reactor space, etc.

Our process exhibits outstanding advantages when used for the synthesis of compounds in which at least one of the carbon-to-carbon double bonds in the cyclopentadienyl-group is olefinic in nature. In other words, in this preferred embodiment not more than two carbons of the cyclopentadienyl ring should be shared with a fused aromatic ring such as a benzene ring. Examples of the cyclomatic radicals of this preferred embodiment include the indenyl radical,

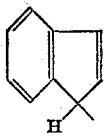

and the cyclopentadienyl radical

When R and R', the cyclomatic radicals, have this type of configuration or structure, that is, where at least one double bond in the cyclopentadienyl-group configuration is olefinic, the resulting cyclomatic manganese compounds are found to have the optimum characteristics for use as fuel and lubricating oil additives.

Our process is especially preferred for the synthesis of RMnR' compounds in which R and R' are cyclopentadienyl radicals composed of a cyclopentadienyl ring having from 0 to 5 hydrocarbon sustituents thereon, said cyclopentadienyl radical having a total of from 5 to 17 carbon atoms. Such cyclopentadienyl-type manganese compounds are found to be especially suited as additives to hydrocarbon fuels for internal combustion engines. Examples of compounds from which such radicals are obtained are: cyclopentadiene; methylcyclopentadiene; phenylcyclopentadiene; 1,2,3,4,5-pentamethylcyclopentadiene; dodecylclopentadiene; etc.

The cyclopentadienyl-type compounds used in the process of our invention consist of a cyclopentadienyl nucleus, the carbon skeleton of which can have other organic or hydrocarbon substituents thereon having up to 12 or more carbon atoms.

When a cyclomatic radical of the compounds prepared by the process of our invention is substituted with univalent aliphatic radicals, these substituents can be radicals having from 1 to about 12 or more carbon atoms, selected from the group consisting of alkyl, alkenyl, aralkyl and aralkenyl. Thus, when these sustituents are univalent aliphatic radicals, they can be alkyl radicals, such as methyl, ethyl, n-propyl, isopropyl, n-butyl, isobutyl, sec-butyl, tert-butyl, n-amyl, the various positional isomers thereof as, for example, 2-methylbutyl; 1-ethylpropyl; and the corresponding straight and branched chain isomers of hexyl, octyl, decyl, dodecyl, hexadecyl, eicosyl and the like. Likewise, the univalent aliphatic substituent can be an alkenyl radical, such as ethenyl, $\Delta^2$-propenyl, $\Delta^1$-butenyl, $\Delta^3$-butenyl, and the branched chain isomers thereof as $\Delta^2$-isobutenyl, $\Delta^2$-sec-butenyl, $\Delta^2$-pentenyl, and the branched chain isomers thereof, $\Delta^3$-hexenyl, and the branched chain isomers thereof, including 3,3-dimethyl- $\Delta^1$-butenyl; and 1-methyl-1-ethyl-$\Delta^2$-propenyl; and the various isomers of heptenyl, nonenyl, undecenyl, tetradecenyl, octodecenyl and the like.

When the organic radical substituted in the cyclomatic group is a univalent aliphatic radical, it can be an aralkyl radical such as, for example, benzyl, $\beta$-phenylethyl, $\alpha$-phenyl-isopropyl, $\alpha$-phenylisobutyl, $\alpha'$-naphthylmethyl, $\alpha$-($\alpha'$naphthyl)-propyl, $\gamma$-($\alpha'$-naphthyl)butyl, $\beta$-($\beta'$-naphthyl)-sec-butyl, the corresponding $\alpha'$- and $\alpha'$-naphthyl derivatives of n-amyl and the various positional isomers thereof, and the like. Other such aralkyl radicals include the $\alpha'$-, $\beta'$-, and $\gamma'$-anthryl derivatives of alkyl radicals such as $\alpha'$-anthrylmethyl, $\Delta$-($\beta$-anthryl)-2-methylamyl, and the like, and the corresponding alkyl derivatives of phenanthrene, fluorene, acenaphthene, chrysene, pyrene, naphthacene, etc. The univalent aliphatic radical can be an aralkenyl radical such as $\alpha$-phenylethenyl, $\alpha$-phenyl-$\Delta^1$-propenyl, and the phenyl derivatives of the isomers of butenyl, heptenyl, and the like, up to about eicosenyl. Other such arylalkenyls include $\alpha$-($\alpha'$-naphthyl) ethenyl, $\alpha$-($\alpha'$-naphthyl)-$\Delta^1$-propenyl, $\alpha$-($\beta'$-naphthyl)-isopropenyl, and the like. In addition, such, aromatic derivatives of alkenyls, that is, aralkenyl radicals include derivatives of phenanthrene, fluorene, chrysene, naphthacene, and the like.

When the organic radicals comprising the substituents in the cyclomatic groups of the compounds prepared by the process of our invention are univalent alicyclic radicals, these can be radicals selected from the group consisting of cycloalkyl and cycloalkenyl radicals. Thus, such univalent alicyclic radicals can be cycloalkyl radicals such as, for example, cyclopropyl, cycloamyl, cyclononyl, cyclodecyl, cyclooctodecyl, and such cycloaliphatic radicals as $\alpha$-cyclopropylethyl, and the like. Similarly, the alicyclic radical substituents can be cycloalkenyl radicals such as $\alpha$-cyclohexylethenyl, $\beta$-cyclooctyl-$\Delta^2$-propenyl, and the like.

When the organic radicals substituted in the cyclomatic groups of the compounds are univalent aromatic radicals, they can be selected from the group consisting of aryl and alkaryl radicals. Thus, these univalent aromatic radicals can be aryl radicals such as, for example, phenyl, naphthyl, anthryl, and the like, including the various monovalent radicals of such aromatics as indene, acenaphthene, fluorene, naphthacene, chrysene, and the like. Moreover, these univalent aromatic radicals can be alkaryl radicals such as, for example, tolyl; 3,5-xylyl; mesityl; ethylphenyl; 1-ethyl-$\beta$-naphthyl, and the like.

The cyclomatic groups of the compounds prepared for our process can be represented by four general formulae. The first class of cyclomatic radicals can be represented by the general formula

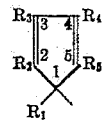

(I)

wherein each of $R_1$, $R_2$, $R_3$, $R_4$ and $R_5$ can be the same or different and is selected from the group consisting of hydrogen and organic or hydrocarbon radicals having from about 1 to about 12 or more carbon atoms. Illustrative examples of such cyclomatic radicals include cyclopentadienyl; methylcyclopentadienyl; 1,2-dimethylcyclopentadienyl; 1,3,4-tripropylcyclopentadienyl; 1-methyl-3-tert-butylcyclopentadienyl; isopropenylcyclopentadienyl; 1-methyl-3-($\Delta^1$-pentenyl)-cyclopentadienyl; cyclohexylcyclopentadienyl; phenylcyclopentadienyl; 1-ethyl-3-($\alpha$-methyl)-cyclopentadienyl acetylcyclopentadienyl; and the like.

The second type of cyclomatic radical is the indenyl-type radical represented by the general formula

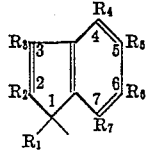

(II)

wherein each of $R_1$, $R_2$, $R_3$, $R_4$, $R_5$, $R_6$ and $R_7$ can be the same or different and is selected from the group consisting of hydrogen and organic and hydrocarbon radicals having from 1 to about 12 or more carbon atoms. Illustrative examples of such cyclomatic radicals include indenyl; 2-methylindenyl; 3,4-diethenylindenyl; 5-($\alpha$-phenylbutyl)-indenyl; 1-phenylindenyl; and the like.

The third type of cyclomatic radical of the compositions of matter prepared by the process of the present invention is a radical of the fluorenyl type which can be represented by the general formula

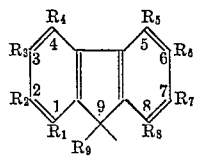

(III)

wherein each of $R_1$, $R_2$, $R_3$, $R_4$, $R_5$, $R_6$, $R_7$, $R_8$ and $R_9$ can be the same or different and is selected from the group consisting of hydrogen and organic and hydrocarbon radicals having from 1 to about 12 or more carbon atoms. Illustrative examples of such radicals include fluorenyl; 3-ethylfluorenyl; 4,5-dipropylfluorenyl; 6-ethenylfluorenyl; 4-benzylfluorenyl; 2-m-tolylfluorenyl, and the like.

The fourth type of cyclomatic radical can be represented by the general formula

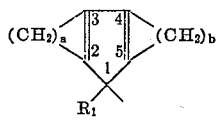

(IV)

wherein $a$ and $b$ can be the same or different and are small whole integers including zero and excluding one, the sum $a+b$ being at least two, and wherein $R_1$ is selected from the class consisting of hydrogen and organic radicals. Thus, when $a$ is zero, each of the carbon atoms designated as 2 and 3 have attached thereto a monovalent radical selected from the class consisting of hydrogen and organic radicals. Furthermore, the monovalent radicals so attached can be the same or different. The same discussion applies to each of the carbon atoms designated as 4 and 5 when $b$ is zero. Illustrative examples of this type of cyclomatic radical include 4,5,6,7-tetrahydroindenyl; 1,2,3,4,5,6,7,8-octahydrofluorenyl; 3-methyl-4,5,6,7-tetrahydroidenyl, and the like.

Non-limiting examples of the compounds prepared by the process of this invention in which the cyclomatic radical has the configuration shown in Structure I above are bis(cyclopentadienyl)manganese; bis(methylcyclopentadienyl)manganese; bis(ethylcyclopentadienyl)manganese; bis(propylcyclopentadienyl)manganese; bis(tert-butylcyclopentadienyl)manganese; bis(cyclohexylcyclopentadienyl)manganese; bis(decylcyclopentadienyl)manganese; bis(1,2,3,4-tetramethylcyclopentadienyl)manganese; bis(1,3-dibutylcyclopentadienyl)manganese; bis(tolylcyclopentadienyl)manganese; bis(acetylcyclopentadienyl)manganese; cyclopentadienyl(indenyl)manganese, and the like.

Examples of compounds having the configuration of Structure II given hereinabove are bis(indenyl)manganese; bis(3-methylindenyl)manganese; bis(3-ethenylindenyl)manganese; bis(2,3-dimethylindenyl)manganese; bis(1,3-diethylindenyl)manganese; bis(1,7-diisopropylindenyl)manganese; bis(1,2,3,4,5,6,7-heptamethylindenyl)manganese; (5-phenylindenyl)(3(2-ethylphenyl)indenyl)manganese, etc.

Examples of compounds having the configuration of Structure III above are bis(fluorenyl)manganese; bis(3-ethylfluorenyl)manganese; bis(4-propylfluorenyl)manganese; bis(2,3,4,7-tetramethylfluorenyl)manganese; and the like.

Examples of compounds having the configuration of Structure IV above are bis(4,5,6,7-tetrahydroindenyl)-manganese; bis(3-methyl-4,7-dihydroindenyl)manganese; bis(2-ethyl-3-phenyl-4,5,6,7-tetrahydroindenyl)-manganese; bis(1,2,3,4,5,6,7,8-octahydrofluorenyl)manganese; bis(1,4,5,8-tetrahydrofluorenyl)manganese; and the like.

The reactive or active manganese metal which we prefer to use can be obtained in a number of ways. Each of these methods provides manganese which is substantially free of oxide coating. For example, manganese obtained by chemical reduction from manganese compounds (e.g. by the use of sodium) is usually deposited in very finely divided form which is in a very reactive state. Another method of obtaining reactive manganese is by the reduction of oxides and sulfides of the metal at elevated temperatures with the aid of hydrogen, carbon, boron, etc. Another method of obtaining finely divided, highly reactive manganese is by distilling off mercury from manganese amalgam. Electrolytic deposition of manganese from a bath of its fused salts produces a preferred reactive form of manganese provided it is not permitted to be contaminated with manganese oxides. The thermal decomposition of certain manganese compounds, such as manganese pentacarbonyl, also produces manganese in the finely divided active state as does comminution in a protective atmosphere of massive manganese metal. Combinations of the above methods are sometimes used. In all these cases, the manganese metal once produced should be kept out of contact with either water or oxygen as manganese reacts readily with these reagents forming manganese hydroxide and manganese oxides. The manganese oxides are very stable compounds and a coating of these on the surface of manganese metal renders the metal partially or totally inactive. Other methods of preparing active manganese metal will be apparent to those skilled in the art.

In order to prevent contamination of reactive manganese metal once it is also formed, it is desirable to carry out our reaction with freshly prepared manganese metal. The preliminary handling and the reaction should be performed in a protective atmosphere, such as nitrogen, argon, helium, methane, cyclopentadiene, ethane, propane, and other hydrocarbons. Ether vapors may also be used to constitute an inert atmosphere.

The following examples will more clearly illustrate the methods by which the process of this invention can be carried out.

EXAMPLE I

Manganese metal (500 parts) produced by electrolysis and containing 99.9 percent manganese was crushed and then placed in a cylindrical reactor. The reactor was heated to a temperature of 300° C. and dicyclopentadiene vapor, with nitrogen gas, was passed through the reactor and in contact with the manganese. The bis(cyclopentadienyl) manganese product was recovered in the form of brown needles by solidification on the cooled surfaces at the exit of the reaction vessel. The product was thereafter purified by repeated resublimation. The melting point of the product was 166° C. and the analysis was: $C_{10}H_{10}Mn$—Calc'd: Mn, 29.67. Found: Mn, 29.5.

At reaction temperatures of 400° C., the bis(cyclopentadienyl) manganese product was recovered at an increased rate.

EXAMPLE II

In a reaction in which manganese metal is contacted with cyclopentadienyl-type compounds in the vapor phase, the apparatus consists of a thermal reactor connected to a distilling vessel with openings for charging and discharging liquids, a temperature measuring device, and heating means. The outlet end of the thermal reactor is connected to a condenser which, in turn, is connected to a receiving vessel. Two parts of finely-divided manganese metal obtained by pulverizing a bar of manganese is uniformly suspended in the thermal reactor by means of a glass wool filler. To the distilling vessel connected to the reactor is added nine parts of cyclopentadiene dimer and the system flushed with oxygen-free nitrogen. To insure that the manganese is in a reactive state, the thermal reactor and its contents are heated to 1250° C. while maintaining a flow of hydrogen through the thermal reactor for a period of about one hour. When no further water vapor is given off, the flow of hydrogen is discontinued. The cyclopentadiene dimer is then heated in the distilling vessel to 180° C. and the vaporized cyclopentadiene in monomer form is passed from the distilling vessel through the thermal reactor over the reactive manganese metal at a temperature of 400° C. The flow of cyclopentadiene over the manganese is aided by a slow stream of nitrogen along with the cyclopentadiene vapor through the thermal reactor. Upon contact of the cyclopentadienyl vapor with the manganese metal, bis(cyclopentadienyl)manganese is formed and collected in the receiving vessel. The product consists of lustrous, brown-black bis(cyclopentadienyl)manganese crystals which, on analysis, are found to correspond to the formula $(C_5H_5)_2Mn$.

Good results are also obtained when the reaction of Example I is carried out at other temperatures within our range, such as 325° C. and 500° C.

When methylcyclopentadiene is used in place of cyclopentadiene in the above procedure, the product is a viscous, reddish-brown liquid which crystallizes on standing and which, on analysis, is found to correspond to the formula $(C_6H_7)_2Mn$.

Other cyclopentadienyl-type manganese compounds are prepared in a similar manner. For example, bis(indenyl)manganese is prepared when indene vapor is passed over the manganese metal in the thermal reactor. When a mixture of cyclopentadiene and methylcyclopentadiene are vaporized and the vapors passed through the thermal reactor, a mixture of products are obtained comprising bis(cyclopentadienyl)manganese, bis(methylcyclopentadienyl)manganese, and cyclopentadienyl-methylcyclopentadienyl manganese. These can be separated by conventional fractionation techniques, if desired.

The product, bis(cyclopentadienyl-type)manganese compound, is inflammable when exposed to the atmosphere and should, therefore, be collected and stored in an inert atmosphere.

The process of Example II is repeated with 2.0 weight percent of oxides of chromium as a catalyst, the quantity of the catalyst being based on the amount of manganese metal used. A higher yield of bis(cyclopentadienyl)manganese is obtained. Good results are also obtained when 0.5 weight percent ammonium molybdate is used as a catalyst.

EXAMPLE III

In the thermal reactor of Example I was placed a mixture of 200 parts of electrolytic manganese of 99.9 plus percent purity in the form of $\frac{1}{16}$-inch fractions, together with a catalytic mixture which consisted of 5 parts aluminum oxide, 0.5 part of ammonium molybdate and 0.2 part of powdered molybdenum metal. These ingredients were thoroughly admixed so as to form a substantially uniform mixture in the reactor. The reactor and its contents were then heated to 525° C. while a flow of hydrogen was run through the reactor. Following the hydrogen flush, to reduce any oxides of manganese that may have been present, the reactor was flushed with dry nitrogen gas. The temperature of the reactor was then brought to 250° C. and cyclopentadiene vapor was passed through the reactor by means of a slow stream of dry nitrogen. Reaction was continued for 4 hours at temperatures ranging between 250° C. and 280° C. A dicyclopentadienyl manganese product was collected as light yellow crystals in the receiving vessel.

When the above run was repeated except that specially pre-purified nitrogen was used as the flushing and entraining gas, the same results were obtained except that the dicyclopentadienyl manganese product was lighter in color than in the previous run.

A preferred method for obtaining the reactive manganese for use in our process is by chemical reduction. Thus, a salt of a manganese compound can be reduced in a suitable non-aqueous medium to form finely-divided manganese metal which can then be reacted with a cyclopentadienyl-type compound. The following example illustrates this process.

EXAMPLE IV

A reaction vessel equipped with means for charging and discharging liquids and solids, gas inlet and outlet means, temperature measuring devices, heating and cooling means, means for agitation, and means for condensing vapors was flushed with pre-purified nitrogen. To the flask was added 400 parts of mineral oil. An atmosphere of nitrogen was maintained in the reaction vessel throughout the run. To the flask was then added 63 parts of anhydrous manganous chloride and 23 parts of sodium metal dispersed in 75 parts of mineral oil, and the mixture maintained in agitation for a period of about one hour, at the end of which time a suspension of dark, finely-divided manganese metal was visible in the reaction mixture. To this reaction was then added 80 parts of methylcyclopentadiene in small increments with agitation over a period of one hour, while maintaining the temperature below about 25° C. After the addition of the cyclopentadiene, the temperature was allowed to rise slowly to 65° C. Reaction between the methylcyclopentadiene and the freshly-reduced manganese metal was evidenced by the slow evolution of hydrogen at a temperature of 25° C. When the solvent in this run is removed by distillation, and the product purified by further distillation at a reduced pressure in nitrogen atmosphere, a good yield of bis(methylcyclopentadienyl)manganese is obtained as a reddish-brown liquid which crystallizes on standing.

Other non-aqueous liquid solvents can be used in place of mineral oil as noted hereinbelow.

EXAMPLE V

Upon repeating the process of Example IV using potassium, manganous bromide and allyl cyclopentadiene in a reaction medium of ethylene glycol dimethyl ether, in the presence of 0.1 weight percent ammonium molybdate catalyst based on the amount of manganese used, a good yield of bis(allylcyclopentadienyl)manganese is obtained.

Other catalysts employed are 0.01 weight percent powdered chromium, 3.0 weight percent ammonium vanadate, 10 weight percent pulverized $WO_2$, the quantity used being based on the amount of manganese employed.

EXAMPLE VI

When the process of Example IV is carried out using manganous nitrate, aluminum, and indene in a medium of a mixture of dioxane and benzene, the aluminum reduces the manganous nitrate to precipitate manganese metal which reacts with indene. Bis(indenyl)manganese is obtained which, on analysis, is found to correspond to the formula $(C_9H_7)_2Mn$.

When the process of Example IV is carried out in a medium of allyl tolyl ether at a temperature of 200° C., it is found that a slightly higher yield of product is obtained. However, at a temperature of 150° C., a good yield of bis(methylcyclopentadienyl)manganese is likewise obtained.

EXAMPLE VII

The process of Example IV is followed using lithium and manganous chloride with the exception that the manganese metal is separated after precipitation under an atmosphere of nitrogen and added to a mixture of cyclopentadiene and methylcyclopentadiene. The product obtained is a mixture of bis(cyclopentadienyl)manganese bis(methylcyclopentadienyl)manganese and cyclopentadienyl-methyl-cyclopentadienyl manganese.

Other cyclopentadienyl-type compounds which are prepared in a manner similar to Example IV above are bis-(3 - ethylindenyl)manganese, bis(fluorenyl)manganese, bis(dodecylcyclopentadienyl)manganese, bis(phenylcyclopentadienylmanganese, bis(4,5,6,7 - tetrahydroindenyl)-manganese, bis(2-octylindenyl)manganese, etc.

Manganese salts can be reduced to the metallic manganese by metals above manganese in the electromotive series, which, in addition to those used in the illustrative examples above, are rubidium, strontium, barium, calcium, magnesium, beryllium and uranium. In addition to the manganese salts used in the illustrative examples, other salts can be employed, such as manganous benzoate, manganous carbonate, manganous phosphate, manganic phosphate, manganous fluoride, manganous iodide, manganese salts of β-keto esters such as the manganese salts of ethyl acetoacetate, etc.

To aid the reaction in liquid medium between the cyclopentadienyl-type compounds with manganese metal which has been chemically reduced, the temperature of the reaction mixture may be elevated to the reflux temperature of the solvent or diluent employed. Temperatures between 0° C. and 500° C. can be used. However, it is found that when the reactions are conducted in a liquid diluent, good results are obtained at temperatures in the range of from 250° C. to about 400° C. which constitutes a preferred temperature range. When conducting the reaction in a closed vessel, pressures up to 1,000 atmospheres and temperatures up to 500° C. can be employed. However, since good yields are obtained at pressures of up to 150 atmospheres and temperatures of up to 400° C., a preferred range of temperature and pressure in a closed vessel is 250° C. to 400° C. and 1 to 150 atmospheres.

Solvents other than those given in the examples hereinabove can be employed. Such other solvents and mixtures thereof are n-butyl ether, dodecyl ether, anisole, dioxane, ethylene glycol ethers such as ethylene glycol dimethyl ether and ethylene glycol diethyl ether, methyl phenyl ether, diethyl ether, decyl ethyl, benzene, cyclohexane, tetrahydrofuran, toluene, xylene, etc. In other words, hydrocarbon and ether solvents having up to 20 or more carbon atoms can be used.

The reaction conditions should be preferably anhydrous when carrying out the process of this invention. However, small amounts of water are tolerable although they may have a tendency to reduce the yield of desired product. When manganese metal is obtained by the reduction of manganese salts, such as manganous chloride, it is found that the salts often contain from 0.1 to about 3.0 percent water by weight. This small amount of water does not appreciably lower the yield of product.

The compounds which are prepared by the process of our invention are useful in the synthesis of other manganese compounds which are also capable of improving combustion characteristics of hydrocarbon fuels. An example of such use is the preparation of methylcyclopentadienyl manganese tricarbonyl as described in the following example.

EXAMPLE VIII

*Methylcyclopentadienyl manganese tricarbonyl*

Bis(methylcyclopentadienyl)manganese, prepared as described in Example IV, was added to a pressure resistant vessel under a nitrogen atmosphere and the vessel charge with carbon monoxide. The vessel and contents were then heated from 22° C. to about 145° C. while maintaining the pressure in the reaction vessel within the range of from about 680 to 2175 pounds per square inch. The uptake of carbon monoxide ceased in about one hour indicating the completion of the reaction whereupon the vessel was cooled and methylcyclopentadienyl manganese tricarbonyl separated from the reaction mixture.

This compound, as well as other cyclomatic manganese tricarbonyl compounds, is found to be exceptionally good agents for improving the antiknock quality of hydrocarbon fuels used in spark ignition engines.

The cyclomatic compounds prepared by the process of the present invention possess particular utility as additives. Thus, many of the cyclomatic derivatives can be used as fuel additives such as for fuels for internal combustion engines of both the spark ignition and compression igniton types, fuels for jet engines and rocket fuels, and the like. Likewise, many of the cyclomatic compounds of the present invention can be successfully employed as additives to natural and synthetic lubricants and greases.

Other important uses of the cyclomatic compounds prepared by the process of the present invention include the use thereof as chemical intermediates, particularly in the preparation of metal- and metallic-containing polymeric materials. In addition, some of the cyclomatic derivatives of this invention can be used in the manufacture of medicinals and other therapeutic materials as well as agricultural chemicals such as, for example, fungicides, defoliants, and so on.

A particular advantage of the compositions of matter produced by the process of the present invention is the fact that by proper selection of the cyclomatic groups attached to the manganese, compounds having "tailor-made" characteristics can be obtained. For example, compounds such as bis(cyclopentadienyl)manganese, cyclopentadienyl indenyl manganese, methylcyclopentadienyl indenyl manganese, bis(indenyl)manganese, will possess different degrees of stability, volatility, and solubility due to the varying complexity of the cyclomatic groups in the molecule. Likewise, the selection of the cyclomatic constituents enables the preparation of compounds of diverse applicability.

This application is a continuation-in-part of our co-pending applications Serial No. 325,224, filed December 10, 1952, now U.S. Patent No. 2,818,416, and Serial No. 581,008, filed April 27, 1956, now abandoned.

Having fully described the process of this invention for the synthesis of the novel cyclomatic manganese compounds, the need therefor, and the best methods for carrying out the process, we do not intend that our invention be limited except within the spirit and scope of the appended claims.

We claim:

1. A process for the preparation of hydrocarbon cyclomatic manganese compounds having the general formula RMnR′ wherein R and R′ are cyclomatic hydrocarbon radicals having from 5 to about 17 carbon atoms which embody a group of 5 carbons having the general configuration found in cyclopentadiene, said compound being further characterized in that the cyclomatic hydrocarbon radicals are bonded to the manganese through the carbons comprising the cyclopentadienyl-group configuration, said process comprising contacting at temperatures up to about 600° C. manganese metal with a cyclomatic hydrocarbon having from 5 to about 17 carbon atoms which embody a group of 5 carbons having the general configuration found in cyclopentadiene.

2. The process of claim 1 wherein bis(cyclopentadienyl)manganese is produced by reacting cyclopentadiene with manganese metal at a temperature up to 600° C.

3. The process of claim 1 wherein bis(methylcyclopentadienyl)manganese is produced by reacting methylcyclopentadiene with manganese metal at a temperature up to 600° C.

4. The process of claim 1 conducted in a non-aqueous organic liquid medium selected from the group consisting of hydrocarbons, ethers, and ether-hydrocarbon mixtures.

5. A process for the preparation of bis(methylcyclopentadienyl)manganese comprising contacting at temperatures up to about 400° C. methylcyclopentadiene with manganese metal in a non-aqueous organic liquid medium selected from the group consisting of ethers, hydrocarbons, and ether-hydrocarbon mixtures.

6. A process for the preparation of bis(methylcyclopentadienyl)manganese comprising contacting methylcyclopentadiene with manganese metal in a non-aqueous organic liquid medium selected from the group consisting of ethers, hydrocarbons and ether-hydrocarbon mixtures at temperatures of substantially 250–400° C.

References Cited in the file of this patent

UNITED STATES PATENTS

| | | |
|---|---|---|
| 2,272,133 | Shappirio | Feb. 3, 1942 |
| 2,680,756 | Pauson | June 8, 1954 |
| 2,680,758 | Thomas | June 8, 1954 |

OTHER REFERENCES

Kealy et al.: Nature, 168, 1039, 1951.

Miller et al.: "JCS (London)," page 632, February 1952.